Feb. 5, 1946.  R. G. VINER  2,394,277
BICYCLE TRAILER AND HITCH
Filed Sept. 10, 1943
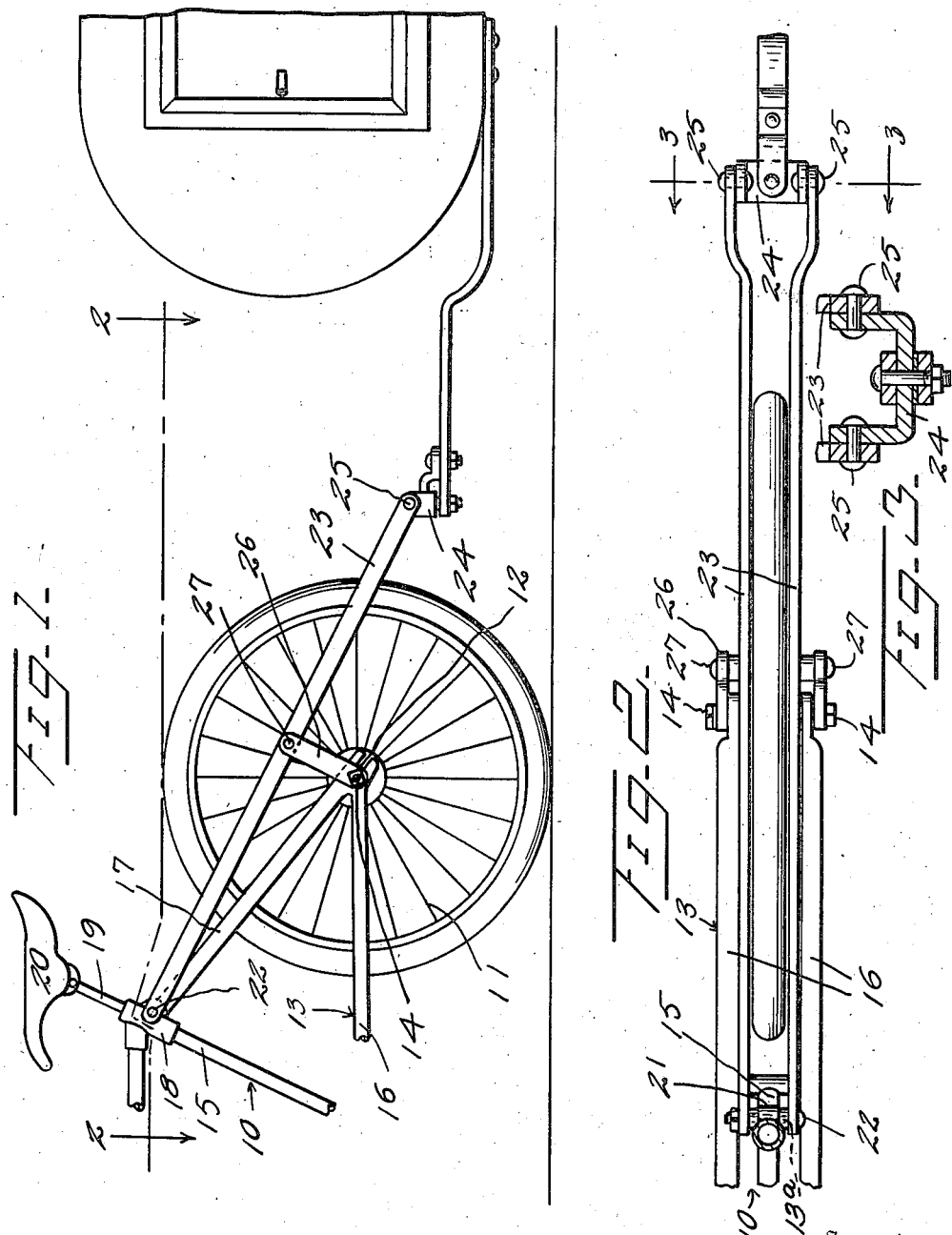
Inventor
Ruth G. Viner
By L. F. Randolph
Attorney Patented Feb. 5, 1946

2,394,277

UNITED STATES PATENT OFFICE 2,394,277

BICYCLE TRAILER AND HITCH

Ruth G. Viner, Cheyenne, Wyo.

Application September 10, 1943, Serial No. 501,861

1 Claim. (Cl. 280—204)

This invention relates to a trailer and hitch for bicycles, motorcycles, tricycles, scooters, or the equivalent.

It particularly is aimed to provide a novel construction which is exceedingly simple and inexpensive and will form an attachment for existing bicycles, motorcycles, tricycles, scooters and the like, in addition to being capable of permanent or detachable connection to the vehicle initially.

The more specific objects and advantages will become apparent from the description following taken in connection with accompanying drawing illustrating an operative embodiment by way of example.

In said drawing:

Figure 1 is a view in side elevation, fragmentarily showing a bicycle with my improved trailer hitch in place and a trailer attached;

Figure 2 is a top or plan view of the parts of Figure 1 taken on the line 2—2 of Figure 1;

Figure 3 is a detail section taken on the line 3—3 of Figure 2;

Referring specifically to the drawing, a bicycle is conventionally shown at 10 as representative of the class of vehicle in connection with which my improved trailer and hitch may be used. This bicycle is to be taken as representative as it equally well may also be a tricycle, scooter, or the like. Such bicycle is shown fragmentarily, and of the parts shown 11 is a conventional rear wheel, adapted to be driven as usual when mounted on an axle 12 secured in a frame 13, said frame having an opening 13a forwardly of the wheel. The nuts which secure the axle in place and which are screw-threaded thereto at opposite ends, are shown at 14. The frame 13 is the usual skeleton frame having the upwardly and rearwardly inclined hollow bar 15, horizontal bars 16 on opposite sides of the wheel, and upper bars 17 on opposite sides of the wheel, the latter extending rearwardly and downwardly. Bar 15 usually has a sleeve or split clamp 18 at the top adjustably to mount the post 19 of the seat 20.

In carrying out my invention it coacts with a bolt 22 which is the bolt that secures the said post 19 in the split clamp 18. Removably applied to opposite ends of bolt 22 and fastened thereon by its nut and head is a pair of draw bars 23. Such draw bars 23 are elongated so as to extend rearwardly of the wheel 11 and at the rear ends such bars 23 are connected by a saddle 24 which is pivotally connected thereto at 25.

A pair of connecting links 26 are pivotally connected at 27, one to each bar 23, and at their other ends they have openings through which the axle 12 passes in order to mount such relatively short links 26 and which latter are held in place by the nuts 14. Nuts 14 enable the links 26 to be detached readily from the bolt or axle 12.

Various changes may be resorted to provided that they fall within the spirit and scope of the invention.

I claim as my invention:

In combination with a bicycle having a frame mounting a rear wheel on an axle, said frame having an opening therethrough forwardly of and above said wheel, draw bars disposed on opposite sides of the wheel, a bolt securing said draw bars to the frame mounted in said opening, said draw bars being disposed above said axle and extending to the rear of the wheel and terminating below the axle, a U-shaped saddle connecting said draw bars at the rear of the wheel to enable attachment of a trailer thereto, relatively short links extending right angularly from said draw bars approximately midway of their ends, said links having openings for receiving said axle.

RUTH G. VINER.